United States Patent Office 3,319,874
Patented May 16, 1967

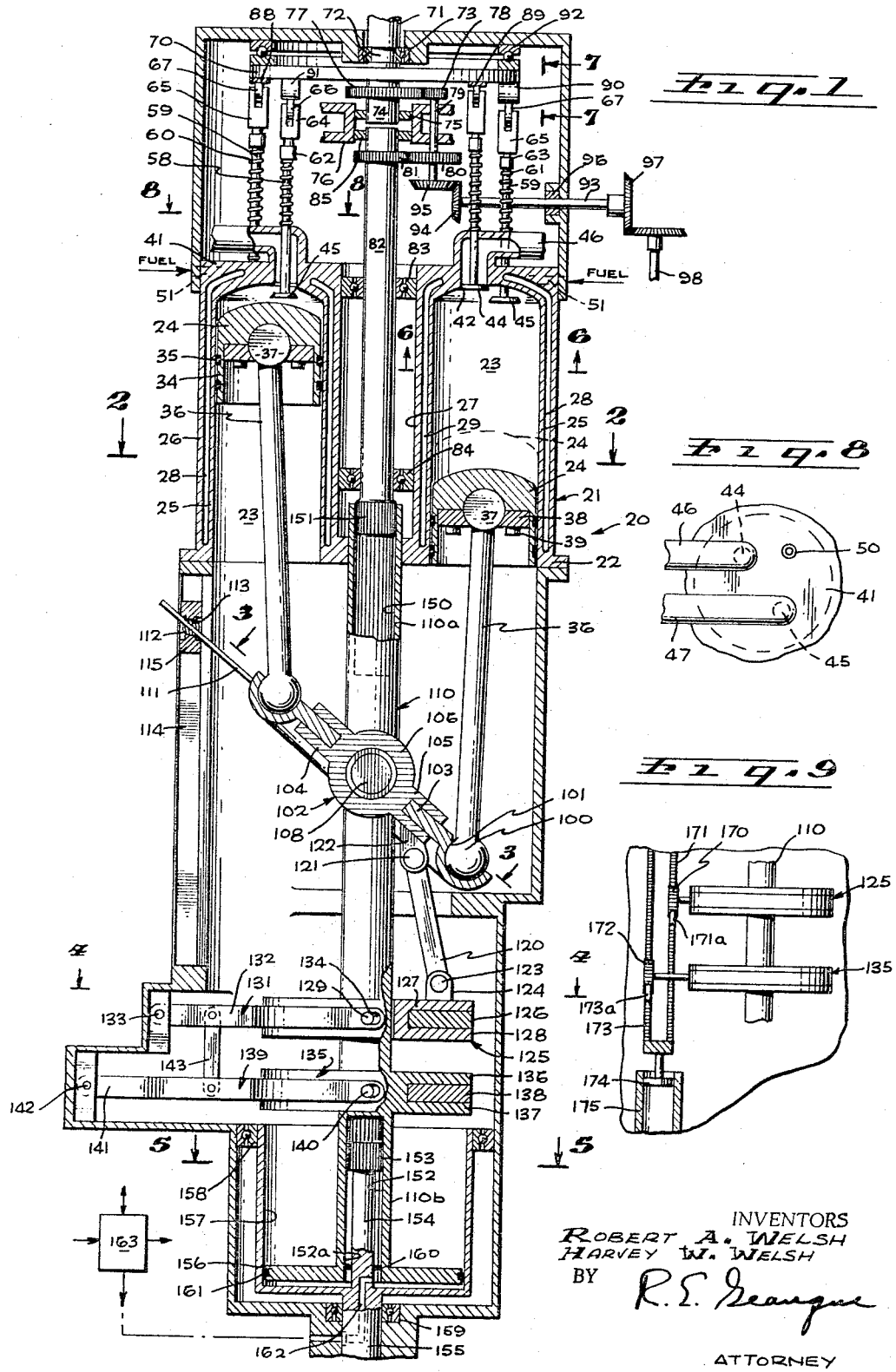

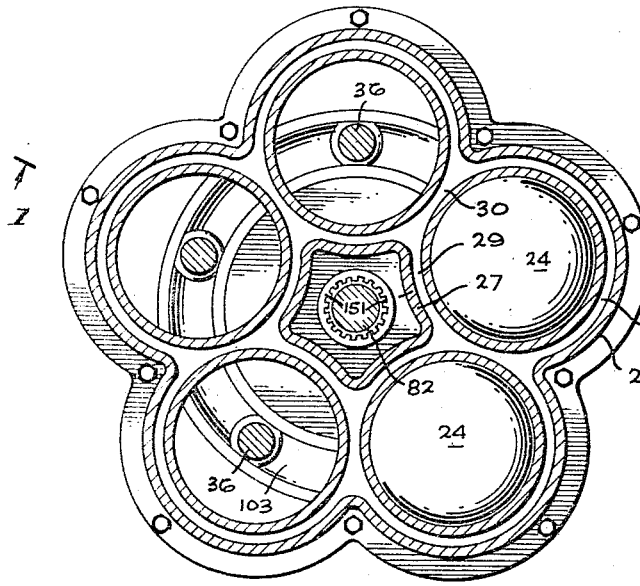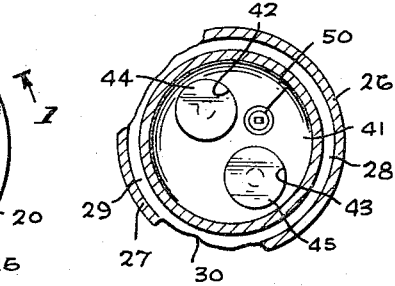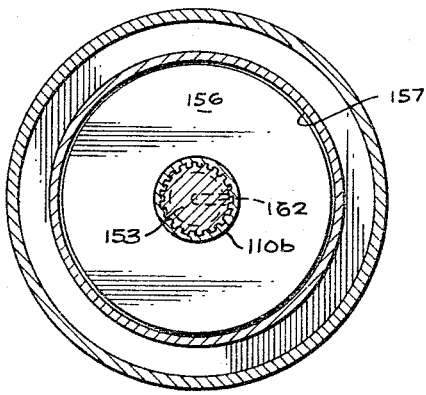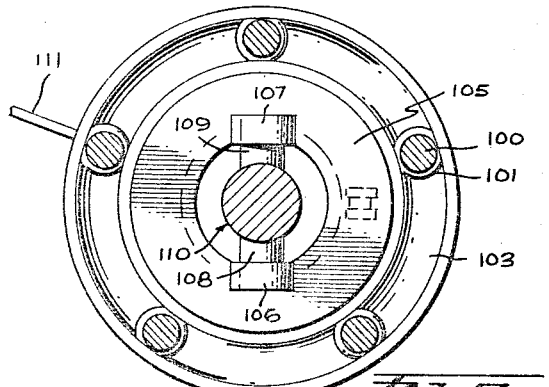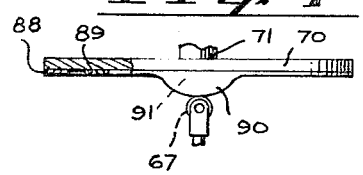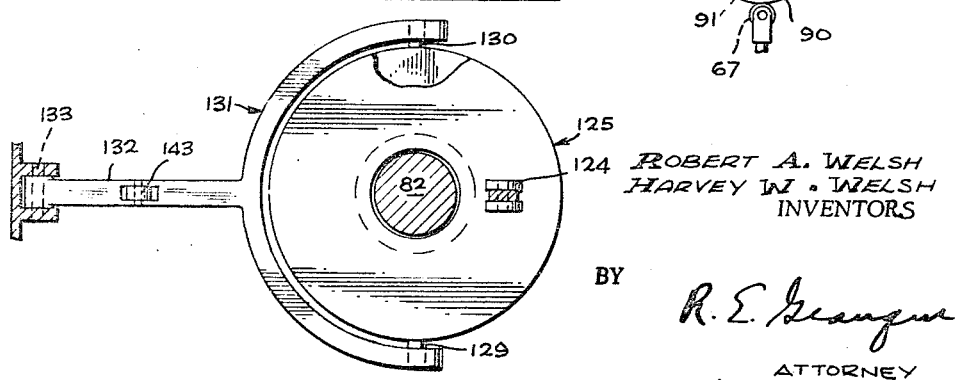
ROBERT A. WELSH
HARVEY W. WELSH
INVENTORS
ATTORNEY

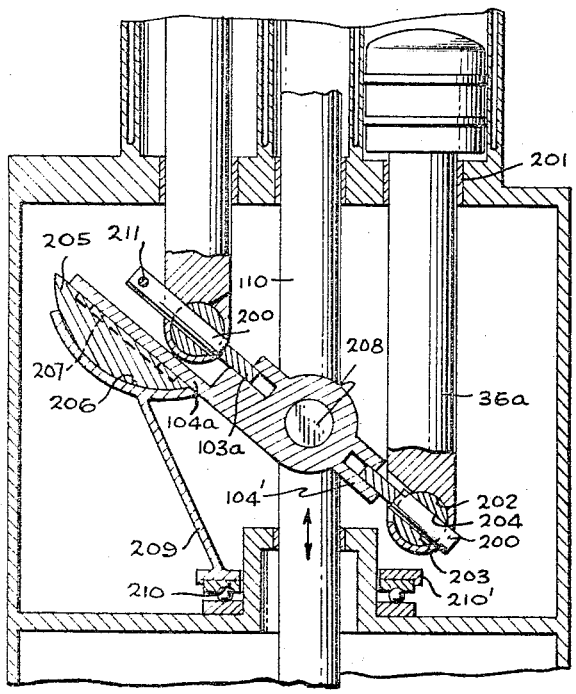
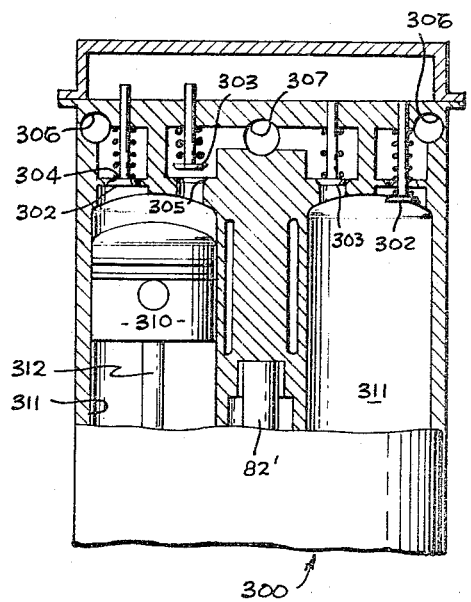
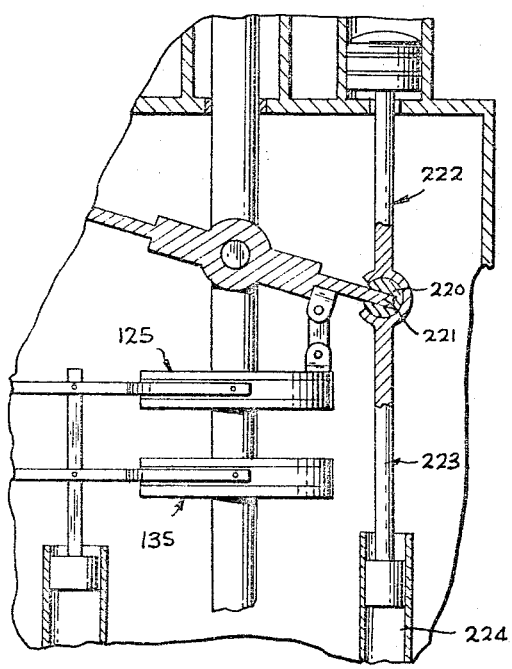

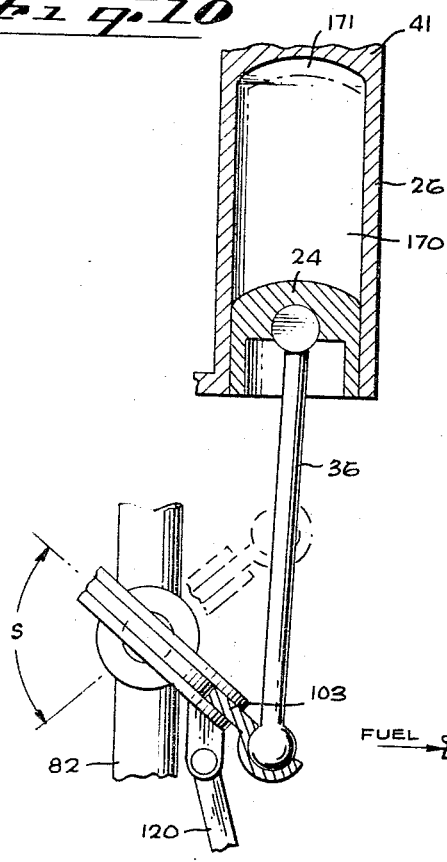
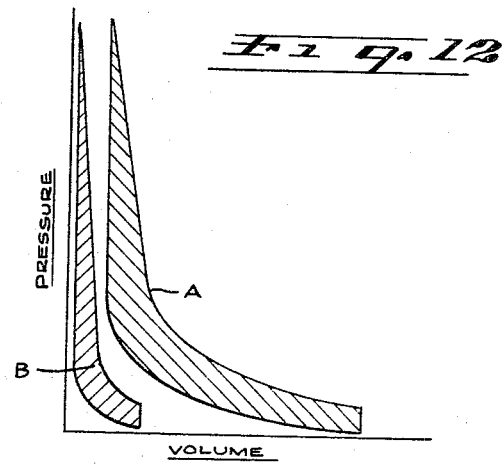
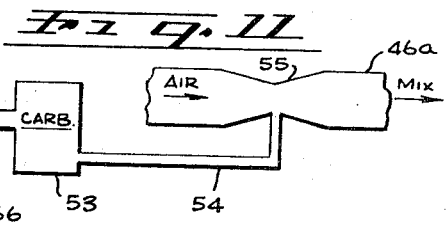
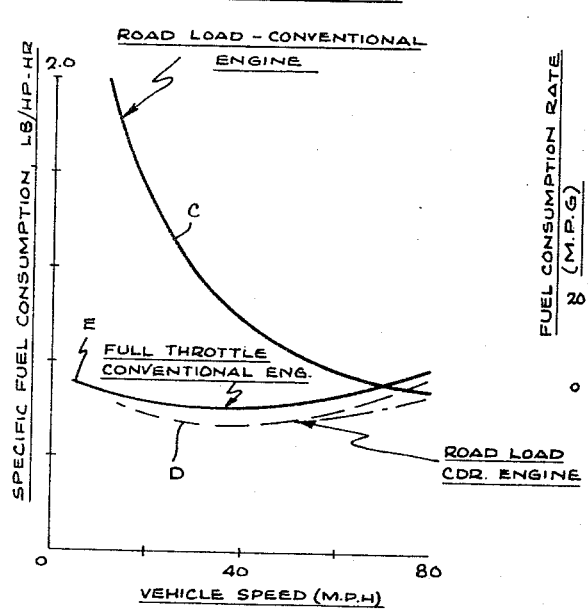
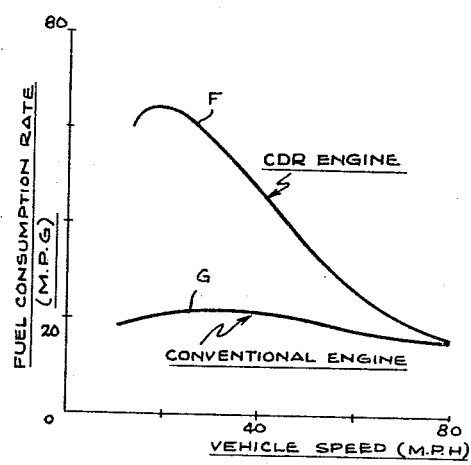

3,319,874
VARIABLE DISPLACEMENT-VARIABLE
CLEARANCE DEVICE
Robert A. Welsh, c/o J.A.W.Q. Box 36, Indiana University, Bloomington, Ind. 47401, and Harvey W. Welsh, 5631 Wilhemina Ave., Woodland Hills, Calif. 91364
Filed Dec. 16, 1964, Ser. No. 418,850
3 Claims. (Cl. 230—56)

This invention relates to a variable displacement-variable clearance engine in which the power output can be varied while maintaining a high efficiency over a broad range of power levels and more particularly to an engine in which the power output can be varied by changing piston displacement while maintaining constant or essentially constant compression ratio, or a compression ratio which varies as some defined function of piston displacement. It also relates to a compressor in which the clearance can be controlled while the output is varied by varying the piston displacement and while much of the description refers to an engine, it is clear to those skilled in the art that the concept also applies to compressors or pumps.

It has been suggested in U.S. Patent No. 3,107,624 to Williams that the piston stroke and, therefore, the piston displacement, can be varied by attaching the piston rods to a wobble plate whose angle can be varied with respect to an axially fixed but rotating shaft. Also, it is known that the compression ratio of a fixed displacement engine can be varied by varying the clearance volume by adjusting the cylinder head position relative to the crankshaft centerline. The present invention describes a mechanism which uniquely combines the variable displacement feature with a means of controlling the clearance volume in such a manner that a constant compression ratio relation or a scheduled compression ratio relation can be maintained over a considerable range of piston displacement variation. The present invention makes it possible to control engine power output by controlling piston displacement, thus eliminating the conventional throttle in the conventional Otto cycle engine and the fuel-air-ratio control in the diesel cycle engine, and permitting the engine to operate at the higher full throttle efficiency over a wide power range. Similar benefits are achieved for the compressor, particularly as it applies to the compression of compressible fluids.

The engine of the present invention utilizes a wobble plate supported on an axially movable drive shaft section with an actuator to change the axial position of the drive shaft section and wobble plate and an actuator to change the angle of the wobble plate in order to vary the piston displacement and, therefore, the power output of the engine. By connecting the drive shaft section and wobble plate for movement together along the axis of the engine and by varying the angle of the wobble plate with axial position, or by separately positioning the drive shaft and controlling the wobble plate angle in the desired manner, the compression ratio of the engine can be maintained constant or substantially constant or varied in a desired manner regardless of power output. Since the power output of the engine at any given shaft output speed is regulated solely by piston displacement, no throttle valve is required and the engine can be operated at full throttle both at full power and at reduced power such an encountered at low vehicle speeds in city driving, and engine efficiency and economy tend to remain constant at reduced power.

In general, the engine design and the type of fuel determines the maximum compression ratio and, therefore, the maximum efficiency at which the engine can be operated. The present invention makes it possible to always approach the maximum compression ratio permissible with the fuel while at the same time varying the engine stroke to vary engine power output. The throttle for standard engines restricts the air flow and, at part throttle, considerable power loss is experienced in drawing the air through the flow restriction. This loss, together with the fact that the friction loss for a standard constant displacement engine remains essentially constant regardless of throttle position, results in inefficiency at reduced power (part-throttle). The present invention provides a much improved engine since the throttle plate is eliminated and the engine can always operate at atmospheric intake pressure, thus eliminating the throttling losses. Further, the piston stroke is reduced at reduced power, thereby reducing the friction load. Similar advantages can be achieved when the concept is adapted to a compressor for pumping fluids, particularly those classified as compressible. In the conventional fixed displacement compressor, it is generally desired to minimize the clearance volume to attain maximum compression effectiveness and to minimize the re-expansion of the residual fluid in the clearance volume. In practice, a compressor usually operates until the pressure in a reservoir tank, which is located in the high pressure discharge line, reaches a limiting pressure at which time the compressor is stopped, or a pressure relief valve vents the excess fluid, or some similar well known method of maintaining discharge pressures within limits. The present invention, on the other hand, permits the use of variable displacement as an efficient method of controlling compressor output since it permits the control of the clearance volume in such a manner that it can be maintained at a desired minimum at all times.

It is therefore an object of the invention to provide a variable displacement-variable clearance engine in which the power output is controlled by varying piston displacement, thereby eliminating the presence of a throttle plate with accompanying throttling power losses at reduced power output.

Another object of the invention is to provide a variable displacement-variable clearance engine which can be run at full throttle regardless of power output.

Another object of the invention is to provide a variable displacement-variable clearance engine in which the compression ratio can be maintained constant, essentially constant, or varied in a desired manner while the piston stroke is varied to control power output.

A further object of the invention is to provide a variable displacement-variable clearance engine in which the piston displacement and mechanical friction is reduced at reduced power output.

A further objective of this invention is to provide a variable displacement-controlled clearance compressor in which the output flow can be controlled by varying the displacement while maintaining minimum clearance volume or any desired schedule of clearance volume.

These and other objects of the invention not specifically set forth above will become readily apparent from the accompanying description and drawings in which:

FIGURE 1 is a longitudinal section along line 1—1 of FIGURE 2, partly in elevation, showing the engine of the present invention.

FIGURE 2 is a transverse section along line 2—2 of FIGURE 1 showing the arrangement of the cylinders of the engine.

FIGURE 3 is a sectional view along line 3—3 of FIGURE 1, illustrating the wobble plate assembly for varying piston displacement.

FIGURE 4 is a sectional view along line 4—4 of FIGURE 1 showing the axially movable but non-rotating collar connected with the wobble plate assembly for varying the angle of the wobble plate.

FIGURE 5 is a transverse section along line 5—5 of FIGURE 1 of the actuator for varying engine displacement and clearance.

FIGURE 6 is a transverse section along line 6—6 of FIGURE 1 showing the valves and spark plug employed for each of the cylinders.

FIGURE 7 is an elevational view of the valve plate taken along line 7—7 of FIGURE 1.

FIGURE 8 is a transverse section along line 8—8 of FIGURE 1 illustrating the inlet and exhaust passages.

FIGURE 9 is a modified displacement and clearance control mechanism for maintaining a desired constant compression ratio.

FIGURE 9a is another modified displacement control mechanism for maintaining a desired constant compression ratio.

FIGURE 10 is a partial view of the wobble plate and one engine cylinder illustrating the stroke and clearance for a given wobble plate angle and longitudinal axial position.

FIGURE 11 is a schematic diagram of a carburetion system for introducing a mixture of fuel and air to the engine.

FIGURE 12 is a comparison of Otto cycle pressure-volume diagrams for two power output levels of an engine having variable displacement and constant compression ratio.

FIGURE 13 is a comparison of the specific fuel consumption of a conventional engine with the engine of the present invention.

FIGURE 14 is a plot of fuel consumption in miles per gallons for a conventional engine and the engine of the present invention.

FIGURE 15 is a partial section of an engine driving a hydraulic pump system.

FIGURE 16 is a partial section of the valve arrangement for a compressor utilizing the invention.

Referring to the embodiment of the invention chosen for illustration, the variable displacement-variable clearance engine 20 (hereinafter abbreviated as CDR engine) has a cylinder section 21 which comprises a bottom plate 22 containing five cylindrical openings 23 for the five pistons 24 of the engine. The number of cylinders can be varied since a 4-stroke cycle engine requires only an odd number of cylinders and a 2-stroke cycle engine can have any number of cylinders. A cylinder wall 25 projects from each opening 23 to form a cylinder for each piston 24. An outer scalloped wall 26 surrounds all of the cylinders 25 and an inner scalloped wall 27 projects from plate 22 between the cylinders. The spaces 28 and 29 between the cylinders and walls 26 and 27, respectively, are connected by the spaces 30 between the cylinders to form a cooling jacket for the cylinders. Each piston 24 has a cylindrical skirt 34 which mounts two piston rings 35 which slide upon the interior of cylindrical wall 25. Also, each piston 24 is connected to cylindrical end 37 of a piston rod 36 by means of a plate 38 secured to the piston by bolts 39. The end 37 is partly received by a semi-cylindrical cutout in piston 24 and partly by a partial cylindrical cutout in plate 38, so that the piston rod end 37 can rotate relatively to the piston.

Each of the cylinders 25 terminates in a cylinder head 41 containing intake and exhaust valve openings 42 and 43 which are controlled by valves 44 and 45, respectively (see FIGURES 1 and 6). An intake port 46 connects with valve opening 42 and an exhaust port 47 connects with valve opening 43 so that the air inlet to each cylinder is controlled by valve 44 and the exhaust from each cylinder is controlled by valve 45. A spark plug 50 is also contained in each cylinder head 41 for igniting the compressed mixture of air and fuel in the cylinder. Fuel is injected into each cylinder through a passage 51 connected to a fuel injector (not shown) of standard construction which is controlled to inject fuel into the cylinder at the proper time during each engine cycle. Since the engine output is controlled by varying piston displacement, no throttle valves are required in air intake ports 46 or the intake manifold (not shown). As illustrated in FIGURE 11, the fuel injection system can be replaced by a conventional carburetor system in which float chamber 53 is connected by fuel line 54 to inlet air passage 46a at the throat of venturi section 55. Fuel is supplied to the carburetor by pump 56 in fuel line 57 and the fuel is mixed with the incoming air which is at about atmospheric pressure and has a flow rate regulated solely by engine displacement. The passage 46a supplies the fuel-air mixture to the engine so that the separate fuel passages 51 are eliminated when the carburetion system of FIGURE 11 is utilized.

The stems 58 and 59 of intake and exhaust valve 44 and 45, respectively, extend through cylinder heads 41 and 45, respectively, and are biased toward the closed position by springs 60 and 61, respectively, which surround the stems and engage collars 62 and 63, respectively, on the stems. The ends of stems 58 and 59 terminate in forks 64 and 65, respectively, which rotatably support rollers 66 and 67, respectively. A circular cam plate 70 is rotatably supported by a stub shaft 71 which has a reduced portion 72 retained by bearing 73. The plate 70 carries another stub shaft 74 having its end received by a bearing in a plate 75 which is supported by a fixed mounting bracket 76. A gear 77 on shaft 74 meshes with gear 78 on shaft 79 which is rotatably supported by bracket 76. The shaft 79 also carries a gear 80 in mesh with gear 81 on the accessory drive shaft 82 and shaft 82 is mounted in bearing 83 and 84 supported by the inner scalloped wall 27. The end of the accessory drive shaft 82 is retained in an opening in plate 85 which is also supported by bracket 76. Rotation of the shaft 82 by the engine causes the cam plate 70 to be rotated by the gear train consisting of gears 81, 80, 78, and 77 and the rotational speed of the plate will be determined by the gear ratios of the gear train.

The gear train shown in FIGURE 1 will reduce the cam speed to one-half the engine speed to provide for four-cycle operation but for a two-cycle engine, no speed reduction would be necessary and the cam plate 70 could be driven directly from the shaft 82. The cam plate 70 carries an outside cam track 88 which is engaged by the rollers 67 for the exhaust valves 45 and an inside cam track 89 which is engaged by the rollers 66 for the intake valves 44. Track 88 has a single lobe 90 of proper profile for opening the valves 45 for the required exhaust time while track 89 has a single lobe 91 of proper profile for opening the valves 44 for the required inlet time. During four-cycle operation, the intake valve 44 and exhaust valve 45 for each cylinder will open once during each two revolutions of the engine since the cam plate speed is one-half the engine speed. Thrust bearing 92 is located between the back face of plate 70 and the engine casing to oppose the force on the plate produced by the spring-biased rollers 66 and 67. The drive system for the engine distributor and accessories (not shown) consists of shaft 93 having an end gear 94 in mesh with a gear 95 on the end of shaft 79. Shaft 93 is supported by a bearing 96 in the engine casing and terminates in a gear 97 which drives the accessory drive 98. It is understood that the distributor will fire each spark plug once for each two revolutions of the four-cycle engine and that other accessories, such as the generator, fuel pump, etc., will be driven at the rated speed by the drive 98, or geared drives from drive 98.

Each piston rod 36 terminates in a ball 100 which is secured in a socket 101 of wobble plate assembly 102. The sockets for all the piston rods are evenly spaced around the outer rim of an annular wobble plate 103 which is slidably received in the groove between two rings 104 and 105 which are supported by two bearing members 106 and 107 and which rotate with the drive shaft 110.

Two pins 108 and 109 are secured to the drive shaft 110 of the engine and support bearing members 106 and 107, respectively. The rings 104 and 105 have a center opening so that the rings oscillate about the pins 108 and 109 without striking the drive shaft 110 as the angle of the annular wobble plate assembly 103 is varied to vary the piston displacement. Plate 103 is prevented from rotating with rings 104 and 105 by an arm 111 which extends from plate 103 through a ball 112 located in socket 113. A pair of opposed channel members 114 (only one of which is shown) slidably support block 115 which contains the socket 113 so that the block is moved back and forth in the channel members by arm 111 as it reciprocates and the arm 111 is free to move back and forth through ball 112 while restraining wobble plate 103 against rotation. The wobble motion of plate 103 causes the rings 104 and 105 to rotate, thereby rotating the engine drive shaft 110.

The engine displacement is determined by the angle of plate 103 to the drive shaft 110. A link 120 is connected at one end by pivot pin 121 to a bracket 122 attached to the ring 104. The other end of the link is connected by pivot pin 123 to a bracket 124 attached to U-shaped collar 125. The collar has a central opening for shaft 110 so that the collar is slidable along the shaft and the collar rotates with the shaft since it is connected with the ring 104. The other end of the link is connected flanges 127 and 128 of collar 125 and has pin 129 and 130 on opposite sides thereof for pivotal connection to the two arms to a yoke 131. The single arm 132 of yoke 131 is pivotally connected to the engine casing by pin 133 so that the control yoke 131 can pivot but ring 126 does not rotate with collar 125. The ends of the yoke arms connected to collar 125 have enlarged slotted openings 134 to permit angular movement of yoke 131 to adjust the position of collar 125 on shaft 110 and thereby adjust the angle of wobble plate 103. A second collar 135 is rigid with engine drive shaft 110 and has two flanges 136 and 137 which slidably receive ring 138. A yoke 139 has two arms which are connected by pins 140 to the ring 138 and arm 141 of the yoke is connected by pins 142 to the engine casing. The openings in the yoke 139 for pins 140 are enlarged to permit axial movement of collar 135. Yoke 139 holds ring 138 against rotation while the collar 135 revolves with the shaft 110. A link 143 is pivotally connected between the two yokes 131 and 139 at about the same distance from collars 125 and 135, respectively. However, length of yoke arm 132 between link 143 and pin 133 is about one half the length of the yoke arm 141 between link 143 and pin 142, but the exact dimensions depend on the overall geometry of the entire mechanism. Thus, movement of collar 135 will cause a larger amount of movement of collar 125 and as will be later discussed, the relative positions of the collars will always be such as to maintain a substantially constant compression ratio regardless of the amount of engine displacement.

The end 110a of shaft 110 is hollow and has a splined interior surface 150 which receives the externally splined end 151 of the axially fixed accessories shaft 82. End 110b of shaft 110 is also hollow and has a splined interior surface 152 which receives the splined end 153 on the reduced portion 154 of the axially fixed output shaft 155. The shaft end 110b terminates in a piston 156 which moves axially within a cylinder 157 which is attached to shaft 155 at the shoulder formed by the reduced shaft portion 154. Cylinder 157 is rotatably supported in fixed axial position by bearings 158 and shaft 155 is supported by bearing 159. An O ring 160 which is attached to shaft portion 154 seals the space between shaft portion 154 and the splineless cylinder inner extension 152a and a piston ring or an O ring 161 is carried by the piston 156. Because of the splined ends of shaft 110, the piston 156 and shaft 110 rotate at the same speed and are axially movable while cylinder 157 only rotates. In order to move the piston 156, hydraulic fluid is connected with cylinder 157 below piston 156 by a passage 162 which leads from a valve 163 of well known construction. The valve controls the supply and exhaust of the fluid in order to selectively position the piston 156.

FIGURE 10 illustrates the piston stroke for a given angle setting of the wobble plate 103 which produces reciprocation through the angle S in moving from the full line to the dotted line position. The engine displacement and piston stroke are determined by the angle of the wobble plate 103. The cylinder displacement volume 171 is that volume between full line and dotted line positions of the piston 24. The volume between the dotted line position of the piston and the cylinder head 41 is the clearance volume 171 and the compression ratio is obtained by dividing the sum of the displacement volume and clearance volume by the clearance volume. As previously stated, in order to approach maximum efficiency for a given engine and fuel, the compression ratio should be maintained nearly constant at its maximum acceptable value. Thus, when it is desired to vary the output of the engine, piston displacement is varied by changing the angle of the wobble plate and the clearance volume is varied by longitudinal movement of shaft 82 and the wobble plate by an amount to maintain a substantially constant compression ratio.

Referring to FIGURE 1, movement of the piston 156 directly changes the longitudinal position of the drive shaft 110 and the wobble plate assembly 102 and through linkages 139, 131, and 120, also change the angle of the wobble plate. By proper proportioning of the lentghs of the linkage members, the simultaneous change in angle and position of the wobble plate will vary the piston stroke while maintaining the same compression ratio. Thus, the engine output at shaft 155 can be varied by changing the piston stroke while the compression ratio is maintained constant at all outputs to maintain high fuel efficiency. For an engine having a cylinder diameter of three inches, maximum stroke of four inches, a maximum displacement of 28.3 cubic inches and a compression ratio of 8:1, the compression ratio can be maintained substantially constant over the operating range with the following dimensions:

|  | Inches |
| --- | --- |
| Distance of pivots for link 143 from axis of shaft 110 | 1.683 |
| Distance of collar pin 122 from axis of shaft 110 | 2.00 |
| Total length of yoke 131 | 2.641 |
| Total length of yoke 139 | 3.441 |

The linkage geometry can be varied to obtain the least variation in compression ratio over the power range or, if desired, to actually schedule a variation in compression ratio as a function of piston displacement. In FIGURE 1, the piston 24 on the right side is starting the exhaust stroke and will move in the direction of the dotted line position. During most of this exhaust stroke, the valve 45 will be open. The piston on the left side has just completed the compression stroke and fuel combustion is occurring with both valves closed.

A modification of the linkage for controlling clearance is shown in FIGURE 9 wherein the collar 125 carries a gear 170 which meshes with a sliding gear rack 171 and an opposite fixed gear rack 171a. Also, collar 135 carries a gear 172 which meshes with a sliding gear rack 173 and a fixed gear rack 173a. The gear racks 171 and 173 connect with the piston 174 for an actuator 175 so that they move together. The rack 171 will axially position the shaft and wobble plate while the rack 173 varies the angle of the wobble plate 103. The amount of movement of both collars is determined by the size ratio between the gears 170 and 172 and a ratio can be selected to maintain a substantially constant compression ratio.

Another alternate mechanism is shown in FIGURE 9a. In this case, the wobble plate 103a has cylindrical rods 200 extending radially from the wobble plate, one for each piston rod 36a. The piston rod 36a is linearly guided by sleeve bearing 201 and has a spherical socket 202 at the wobble disc end. Inside the socket 202 is a spherical bearing 203 which is free to rotate in said socket and also has a cylindrical hole 204 through which the cylindrical rod 200 is free to slide. The ring 104' has a flat extension on one side 104a which bears against slipper 205 which, in turn, bears against shoe 206. The flat ring extension 104a is slidably connected by a tongue and groove connection 207 to the flat side of the slipper 205 and the slipper is rotatably supported by and confined within the tongue-shaped shoe 206. The entire assembly, 104', 104a, 205, and 206 rotate with the drive shaft 110 and the wobble plate and ring assembly rotate about pin 208 in a similar manner to the connection 108 previously described. The shoe 206 is rotatively supported by arm 209 terminating in a ring 210 supported by flange 211'. The mechanism is designed so that axial movement of the drive shaft 110 will rotate the entire wobble plate assembly about the pivot axis 211 which is an axis of the cylindrical arc which forms the back side of the slipper 205. This axis 211 rotates with the ring 105, the shoe 206 and the slipper 205. The location of the pivot axis 211 can be adjusted according to known geometric and algebraic relations to maintain a theoretically constant compression ratio, or a varying compression ratio, or a constant clearance volume as the displacement is varied.

Referring to FIGURE 12, the engine cycles for two different power outputs are illustrated by the pressure-volume diagrams. As previously explained, the engine operates at full throttle under all loads. The cycle A represents a full throttle and 100% power while cycle B represents full throttle and 20% power at some given engine speed. It is apparent that both the cylinder displacement volume and the clearance volume are different for these two cycles but the compression ratio remains the same, hence efficiency remains substantially constant over a wide power range. A comparison of the specific fuel consumption and the fuel consumption rate of the CDR engine of the present invention with conventional engines is shown in FIGURES 13 and 14, respectively. Curve C of FIGURE 13 shows the high specific fuel consumption of a conventional engine at part throttle whereas the specific fuel consumption of the present engine (curve D) remains about constant at all road loads over the normal speed range. The "road-load" power is defined as that power required to maintain steady vehicle speed. Also, the CDR engine has lower specific fuel consumption at road-load power than a conventional engine at full throttle (curve E). This same superiority is reflected in vehicle mileage in FIGURE 14 wherein curve F shows the miles per gallon for the present CDR engine and curve G shows miles per gallon for a conventional engine. While FIGURES 13 and 14 are based on computations utilizing available published data, it is understood that the comparisons are approximations only.

The engine can be combined with a hydraulic pump as diagrammatically shown in FIGURE 15 to provide a means of directly converting the power of the engine piston to hydraulic power while greatly relieving the loads acting on the wobble plate and bearing assembly. During the power stroke of the engine piston and rod assembly 222 the force is transmitted directly to the hydraulic piston assembly 223, hence relieving the forces acting on the spherical bearing 220 and the wobble plate assembly 221. The hydraulic pump 224 operates on a 2-stroke cycle, hence most of the power delievered by the engine pistons 220 is delivered directly to the hydraulic pump 224 and very little power is transmitted to the wobble plate 221. When the engine operates on the 4-stroke principle, approximately half of the power is delivered to the pump 224 and half to the wobble plate 221 from which it is transferred to other hydraulic pump pistons. In either case, the reduction in force on the spherical bearing 210 and the wobble plate 221 significantly reduces the friction force and the resulting friction power loss.

In FIGURE 16, there is shown a compressor in which the cylinders 311 contain pistons 310 connected by shafts 312 to a wobble plate assembly (not shown) which can be the same as any of the plate assemblies shown for the engine. The pistons are driven by the wobble plate assembly which in turn is driven by power applied to the drive shaft 82'. The movement of the wobble plate on the drive shaft controls the clearance while the output is varied by changing the angle of the wobble plate to vary piston displacement. Each of the cylinders have an inlet valve 302 and an outlet valve 303 and the valves have seats 304 and 305, respectively, facing in opposite directions. On the compression stroke, valve 302 is closed and valve 303 is open to connect the cylinder to common output passage 307. On the intake stroke, valve 303 is closed and valve 302 is open to connect the cylinder with low pressure inlet passage 306.

By the present invention, an internal combustion engine is provided in which power output is controlled by varying piston displacement, as contrasted with the conventional Otto cycle engine in which power is controlled by varying the angle of a throttle plate in the induction system, or as contrasted with the conventional diesel engine in which the power output is controlled by varying the fuel-air ratio. Also, since no throttle plate is utilized, no throttle losses are encountered at reduced power as occurs at part-throttle in the Otto cycle and the CDR engine always operates at substantially atmospheric intake pressure. The engine of the present invention also has the advantage that the friction loss at any given engine speed decreases as the power output decreases. This results from the fact that the CDR engine has reduced stroke at low speeds.

While the clearance control mechanism that varies the wobble plate angle with shaft displacement can consist of the linkage of FIGURE 1 or the gear rack of FIGURE 9, or the mechanism of FIGURE 9a, it is understood that other mechanisms could be used and that the angle and shaft positions could be independently set for any given power requirement. Also, the automatic clearance control mechanism can maintain a constant compression ratio or can vary the compression ratio as a function of displacement according to a desired schedule. Various types of actuators can be utilized to move the engine shaft and known types of transmissions can be adapted for use with the engine. Various other modifications are contemplated by those skilled in the art without departing from the spirit and scope of the invention as hereinafter defined by the appended claims.

What is claimed is:
1. An internal combustion engine comprising:
  a plurality of pistons each slidable within a cylinder;
  an axially movable shaft;
  wobble plate means pivotally mounted in said shaft about an axis transverse to the axis of said shaft;
  a plurality of piston rods for connecting said piston to said wobble plate;
  means for varying the angle between said wobble plate and said shaft to vary the stroke of said pistons;
  means for axially moving said shaft and wobble plate to provide a desired clearance for any piston displacement; and
  hydraulic pump means having piston means connected with said piston rods on the opposite side of said plate from said engine pistons to transfer a large part of the power from the engine piston directly to said hydraulic piston means thereby relieving the forces on the wobble plate and other engine parts.

2. An internal combustion engine comprising:
  a plurality of pistons each slidable within a cylinder;
  an axially movable drive shaft section;
  wobble plate means pivotally mounted on said drive shaft section about an axis transverse to the axis of said drive shaft section;

a plurality of piston rods for connecting said pistons to said wobble plate means;

means for axially moving said drive shaft section and varying the angle between said wobble plate means and said drive shaft section to provide a desired compression ratio and stroke of said piston;

said wobble plate means comprising a wobble plate having a plurality of members extending radially therefrom and spaced apart to place one member adjacent an end of each piston rod;

connecting means for connecting each member to the end of one rod while permitting reciprocation of said rod in a straight line;

said angle varying means comprising slipper means rotatable with said wobble plate in a fixed path; and means attaching said slipper means and said wobble plate for pivoting said wobble plate upon axial movement of said drive shaft section.

3. An internal combustion engine as defined in claim 2 wherein:

each of said members comprise a cylindrical rod;

said connecting means comprising a spherical socket in the end of each piston rod adjacent said wobble plate;

a spherical bearing rotatable in each of said sockets and having a cylindrical hole for slidably receiving one of said rods;

said attaching means comprising an extension on one side of said wobble plate;

a shoe supported for rotation about said drive shaft section in a fixed path; and a slipper having a cylindrical surface rotatably supported in said shoe and having a slidable connection on the other side with said extension;

said wobble plate being movable about the axis of said cylinder surface upon movement of said drive shaft section.

References Cited by the Examiner

UNITED STATES PATENTS

| | | | |
|---|---|---|---|
| 1,229,009 | 6/1917 | Allison | 123—58 |
| 1,346,672 | 7/1920 | Patton | 74—60 |
| 1,407,047 | 2/1922 | Trowbridge | 123—58 |
| 2,513,083 | 6/1950 | Eckert | 74—60 |
| 2,532,254 | 11/1950 | Bouchard | 123—58 |
| 2,539,880 | 1/1951 | Wildhader | 123—58 |
| 2,765,616 | 10/1956 | Cockerell | 123—58 |

FOREIGN PATENTS

| | | |
|---|---|---|
| 252,225 | 5/1926 | Great Britain. |
| 308,835 | 3/1929 | Great Britain. |
| 692,148 | 5/1953 | Great Britain. |

MARK NEWMAN, *Primary Examiner.*

W. E. BURNS, *Assistant Examiner.*